Dec. 18, 1945.   J. O. ROSS ET AL   2,391,195
DRIER
Filed March 16, 1943   2 Sheets-Sheet 1

INVENTOR
John O. Ross
Jean F. Gschwind
BY
Kenyon + Kenyon
ATTORNEYS

Dec. 18, 1945.  J. O. ROSS ET AL  2,391,195
DRIER
Filed March 16, 1943  2 Sheets-Sheet 2
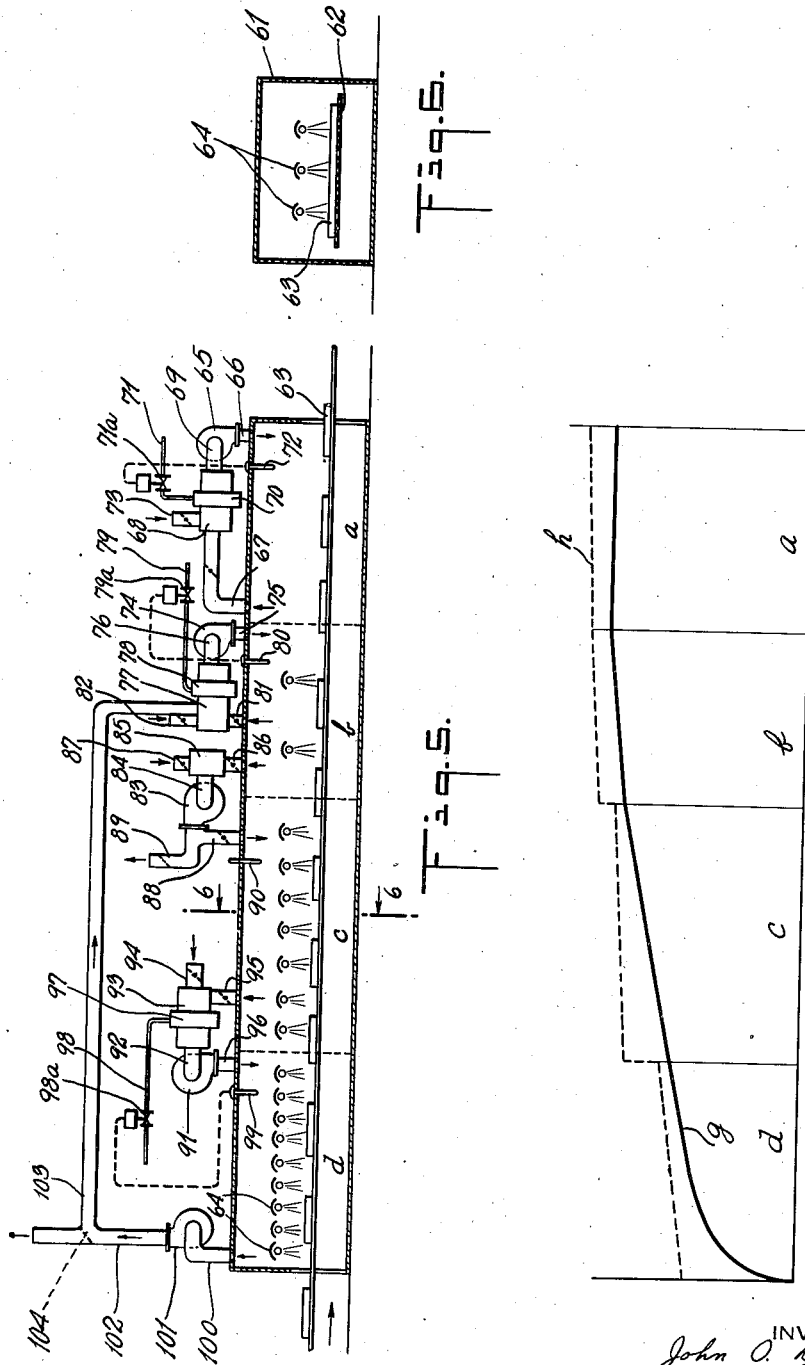
INVENTOR
John O. Ross
Jean F. Tschwind
BY
Kenyon and Kenyon
ATTORNEYS

UNITED STATES PATENT OFFICE 2,391,195

DRIER

John O. Ross, New York, and Jean F. Gschwind, Scarsdale, N. Y., assignors to J. O. Ross Engineering Corporation, New York, N. Y., a corporation of New York Application March 16, 1943, Serial No. 479,321

2 Claims. (Cl. 34—17)

This invention relates to driers, bakers and polymerizers (hereinafter for convenience termed driers) and more especially to those of the infrared ray type. A characteristic advantage of infrared ray heating is the possibility of obtaining high concentration of heat and of subjecting goods to a high intensity of radiation during a given time. Quick heating-up results thereby and not only saves time but often improves the quality of the treated goods. However, infra-red ray heating with the possible exception of gas combustion, is expensive when judged on a B. t. u. basis.

For the following reasons, commercial infrared ray driers are often of oven type in that the infra-red ray source is enclosed in a housing or tunnel containing gas, gas mixtures or vapor, hereinafter referred to as gasiform fluid. Infrared ray heating, particularly when electric lamps are used as the energy source, is more effective in an enclosure due to the fact that not all radiation produced by the lamps strikes the goods to be dried nor will the goods generally retain all incident radiation. A good portion of the irradiated energy which bypasses the goods, or energy reflected by the goods, is collected by the walls of the enclosure, which, if constructed of reflective material, re-direct some energy towards the goods, thus improving the efficiency of the heating operation. Also, in the curing of varnishes, lacquers, and other coatings, solvents are liberated as vapor and drying processes generally produce water vapor, which vapors should advantageously be collected and discharged in such manner as not to imperil the health of the workers.

The efficiency of infra-red ray heating equipment may be defined as the amount of energy retained by the goods to be dried, divided by the total energy expended. The retained energy is the difference between the heat put into the goods and the heat given up or lost by the goods to the surroundings. Air if vapor free, is not heated by the infra-red rays but may be heated by the goods and oven walls by convection. Therefore, the smaller the heat loss from the goods during the heating period, the more efficient is the infra-red ray heating and the less expensive is the operating cost of the infra-red ray service. Since the flow of radiant energy is directed from the hotter to the colder body, it follows that the ambient temperature of air or other gasiform fluid in the enclosure, as well as the walls of the enclosure, should have equal or higher temperature than the goods in order to prevent loss of heat from the goods. It is evident, however, that too high temperature will cause excessive heat losses, such losses being composed of losses by conduction through the oven walls and losses due to unduly hot exhaust.

In the case of drying goods which yield vapors and gases upon drying, such vapors and gases must be expelled from the oven in order to create good drying conditions, prevent the formation of explosive mixtures, and prevent the accumulation of noxious fumes. In such cases a considerable amount of make-up gasiform fluid must be introduced into the oven. Such gasiform fluid will generally be at room or outside temperature and since the oven walls, etc. represent a relatively small heating surface, the temperature of the gasiform fluid will not be raised thereby sufficiently to be above the temperature of the irradiated goods.

An object of this invention is to increase the efficiency of infra-red ray driers and also to reduce the operating expense.

According to this invention, the enclosure of an infra-red ray drier is equipped with means by the operation of which air or other gasiform fluid surrounding the goods to be dried is maintained at the same, or slightly higher, temperature than the goods to be dried. With this arrangement, the goods to be dried are introduced into the oven at substantially atmospheric temperature and the air surrounding the goods is likewise at substantially atmospheric temperature, or slightly higher. As the goods rise in temperature, due to the action of the infra-red rays, the temperature of the surrounding gasiform fluid is correspondingly raised to at least as high a temperature, or slightly higher, than the temperature of the goods. The rise in gasiform fluid temperature is accomplished by introducing hot gasiform fluid into the enclosure at the proper temperature and quantity to maintain the desired relationship with concomitant exhaust of relatively low-temperature gasiform fluid from the enclosure. The introduced gasiform fluid is heated by any inexpensive method and only heat is supplied by the gasiform fluid to maintain the relationship above referred to, thus minimizing the operating cost of the drier. The infra-red ray heater operates at maximum efficiency since the heat supplied therefrom to the goods is fully retained by the goods and there is no loss of heat from the goods to the surroundings.

Infra-red ray drying equipment embodying the features of the present invention may be either of the batch type or the continuous-feed type. In either type of equipment, a substantially uniform temperature differential is progressively maintained between the goods to be dried and gasiform fluid surrounding the goods. For maximum efficiency and minimum expense the temperature differential should be zero degrees, but as a practical matter, a temperature differential substantially in the range of five to ten degrees is contemplated. This differential assures maximum operating efficiency of the infra-red ray source by preventing heat loss from the goods and securing nearly the minimum cost of providing the heated gasiform fluid surrounding the goods. In the continuous-operation type, the temperature differential may vary over a predetermined range during the travel of the goods.

Although in the continuous-feed equipment, the temperature differential preferably is produced by a countercurrent flow of hot gasiform fluid, a different procedure is used than in the ordinary convection drier. In such a drier, hot gasiform fluid is introduced at the dry end of the enclosure at the maximum temperature which the goods to be dried will stand, and there is no reason for and no attempt made to lower the temperature differential between the goods and the gasiform fluid at consecutive points in the travel of the goods. According to the present invention, hot gasiform fluid is introduced into the dry end of the enclosure at only a slight increase in temperature over the temperature at which the goods are fully dried, and during the flow of the gasiform fluid countercurrent to the goods, regulation is provided to maintain the gasiform fluid at only slightly higher temperature than the goods. With this arrangement, the infra-red ray source provides energy only for heating the goods to be dried, while all the other heating requirements are satisfied by the hot gasiform fluid and little or no use is made of energy from the gasiform fluid for the purpose of heating the goods.

In the ordinary convection drier utilizing the counterflow principle, the problem is that wet and comparatively cold goods enter at one end and as they progress through the drier heat is absorbed from the gasiform fluid and the goods begin to give up moisture. With almost all goods the removal of moisture makes it possible to apply much hotter gasiform fluid so that, as a result, the hottest gasiform fluid is usually introduced where the goods are driest. Furthermore, as the gasiform fluid travels against the direction of the goods, it imparts considerable heat thereto so that the temperature of the gasiform fluid is lowered. As the gasiform fluid travels along and continually becomes cooler, partly due to its heating effect on the goods and partly due to evaporating moisture, it comes in contact with cooler goods, and, therefore, has much higher heat-transmitting capacity than if it encountered warmer goods, as would be the case if the goods were subjected to concurrent flow. In addition, moisture is given up slowly to the gasiform fluid so that initially it does not carry its full percentage of moisture, but, as it travels toward the cold end and gives up so much heat, it is lowered correspondingly in temperature and moisture-carrying capacity and hence, when it passes out of the oven at the goods-entering end, it carries a much higher percentage of humidity. The gasiform fluid is materially decreased in temperature as considerable heat is required to heat up the goods and the water contained therein, to supply the heat of vaporization and to make up for oven radiation losses. The quantitive temperature drop is incidental since for the best oven efficiency the initial gasiform fluid temperature is determined by the time cycle and the maximum temperature the goods can stand. For this reason, in many cases, convection driers utilizing the contra-flow principle reheat the recirculated gasiform fluid at different points in order to increase the differential. Gasiform fluid is blown into the drier at the highest temperature that the dried goods will stand and the length of travel of the gasiform fluid is determined solely by the distance it can travel before it reaches the practical limit of its ability to pick up moisture.

In the case of a drier for goods that give off solvents instead of moisture, the solvents are given off most rapidly when the goods first enter the drier, and the only heat available for heating up the goods is the heat in the gasiform fluid supplied to the drier. Again, it follows, as in the first-mentioned drier, that the hottest gasiform fluid can be blown on the goods when they are at the highest temperature and usually this gasiform fluid should be at the very highest temperature that the goods will tolerate. Considerable fumes are still given off all along the drier enclosure, although a large proportion is given off at the early stages of drying. Therefore, by introducing the hot, fresh gasiform fluid at the hot end, the gasiform fluid is put in at a very much hotter temperature than it could be introduced anywhere else in the drier, and the gasiform fluid is swept toward the entering-end so as to sweep the small amount of solvent fumes toward the point where the fume release is heaviest and the exhaust is removed at that end.

In the present invention, the counterflow principle is for a different purpose. Little or no heat is supplied by the gasiform fluid for the purpose of heating the goods. Such heating is done practically by the infra-red rays. Therefore, the gasiform fluid surrounding the goods is either at the temperature of the goods or slightly above, instead of the gasiform fluid being at the highest temperature which the goods will stand, and the gasiform fluid is at only a sufficiently high temperature to maintain equal, or slightly higher, temperature around the goods. The gasiform fluid travels counterflow not for any of the reasons above stated in connection with the convection-type drier, but because at the leaving-end, the material has reached its highest temperature and the gasiform fluid only cools due to heat loss from the drier walls. A definite relationship between the temperature of the goods and the temperature of the gasiform fluid is desirable. As so little heat is taken from the gasiform fluid, it is evident that there is only a very slight drop in the temperature of the gasiform fluid as compared to an ordinary counterflow drier. Therefore, in some cases, the drier is divided into several zones with the gasiform fluid traveling only a short distance at a temperature which always is higher than the required temperature. The gasiform fluid is then removed and reconditioned to a lower temperature, which, however, is slightly higher than the temperature of the goods at the point of gasiform fluid returning into contact with the goods. Instead of holding up the temperature of the gasiform fluid as it passes along the drier, the temperature of the gasiform fluid is deliberately lowered so as to maintain as nearly as possible a uniform temperature differential between the goods and the surrounding gasiform fluid as the goods travel the length of the drier enclosure.

Other objects, novel features and advantages of this invention will become apparent from the following specification and accompanying drawings, wherein:

Figure 5 is a longitudinal section of a modified form of drier for practicing the invention;

Figure 6 is a section on the line 5—5 of Fig. 4, and

Fig. 7 is a diagrammatic view illustrating the temperature relations effected in the apparatus of Figure 5.

Figure 1:
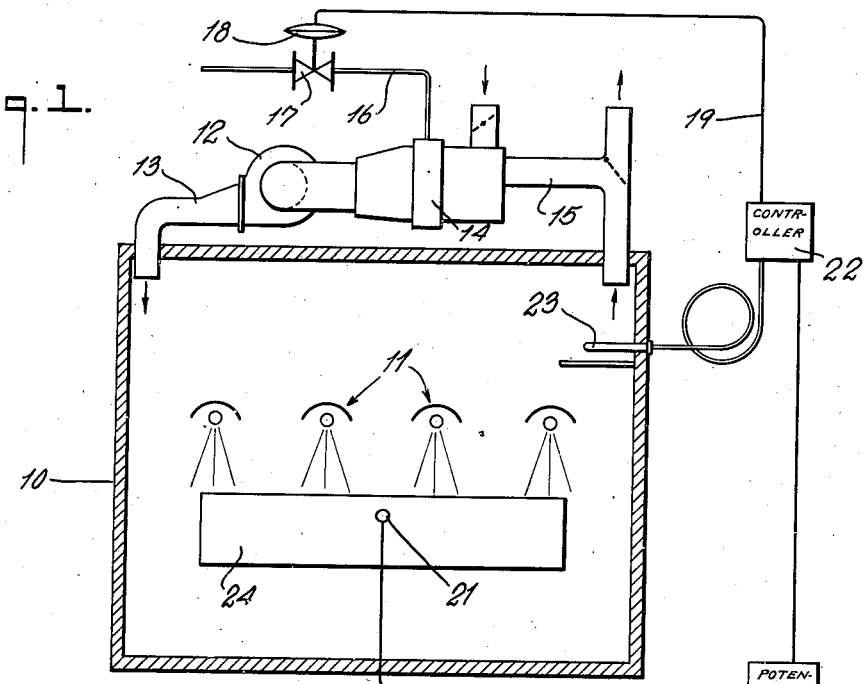
Figure 1 is a vertical section through a batch oven for practicing the invention.

In Fig. 1, 10 is an insulated enclosure in which one or more sources 11 of infra-red rays are arranged. Preferably, each source 11 consists of an electric lamp and a suitable reflector. Above the enclosure is located a blower 12, the exhaust port of which communicates with a duct 13 leading into the enclosure 10. The inlet port of the blower 12 communicates through a heater 14 with a duct 15 leading from the interior of the enclosure 10. By this arrangement gasiform fluid is circulated through the enclosure and the gasiform fluid is heated to the desired temperature by means of the heater 14 to which steam is supplied through the pipe 16 controlled by a valve 17. The control valve 17 is operated by a diaphragm 18 which is in communication with an airline 19. In the line 19 is provided a throttling control potentiometer 20 electrically connected to a thermo-couple 21 and a resetting thermometer controller 22 connected to a thermostat 23 in the enclosure 10. These instruments are all commercial devices and the particular structure thereof forms no part of this invention.

The goods 24 to be dried are arranged in the enclosure 10 in position to be subjected to the infra-red rays emanating from the sources 11. The thermo-couple 21 is associated with the goods 24 in any suitable manner to insure that the temperature of the thermo-couple is the same as the temperature of the goods. The throttling control potentiometer 20 regulates the flow of air in the control line 19 in accordance with the temperature of the thermo-couple 21 and the controller 22 imposes additional regulation of air-flow in line 19 in accordance with the temperature of the thermostat 23 so as to maintain a predetermined temperature differential between the temperature of the goods 24 and the temperature of the gasiform fluid in the enclosure. This temperature differential is progressively maintained by increasing the temperature of the air through operation of the control valve 17 in response to changes in temperature of the goods 24. The gasiform fluid circulated through the enclosure usually is air but may be any gas or vapor.

Figure 2:
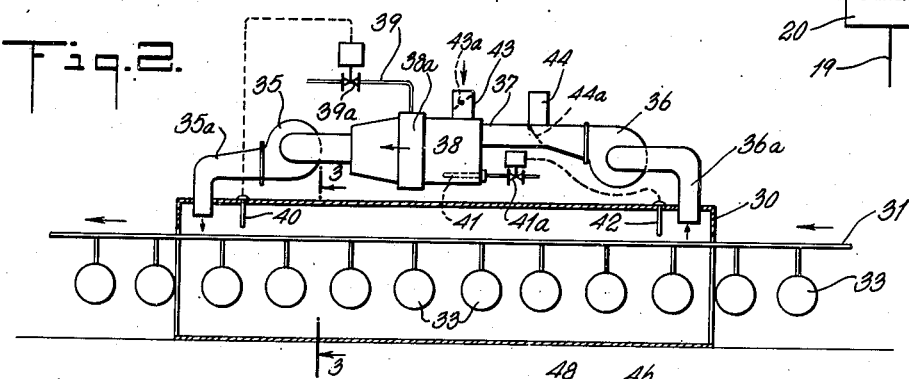
Figure 2 is a vertical section through a continuous feed drier for practicing the invention.
Figure 3:
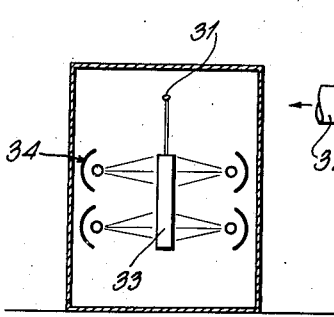
Figure 3 is a section on the line 3—3 of Figure 2.

In Figs. 2 and 3, the enclosure 30 is provided with a conveyor 31 by means of which the goods 33 are carried through the enclosure from one end to the other. Sources 34 of infra-red rays are arranged along each vertical wall of the enclosure and the goods 33 pass between two sets of sources.

A blower 35 has its outlet port communicating through a duct 35a with the discharge end of the enclosure. A duct 36a leads from the entering end of the enclosure to the inlet of a blower 36, the outlet of which communicates through a duct 37 with a plenum chamber 38 which also is in communication with the inlet of the blower 35. The plenum chamber 38 is equipped with a heater 38a to which steam is supplied through a pipe 39 provided with a control valve 39a responsive to thermostat 40 arranged near the exit end of the enclosure. A steam pipe 41 leads into the plenum chamber 38 and is provided with a control valve 41a responsive to a wet bulb thermostat 42 arranged near the entrance end of the enclosure. A duct 43 controlled by a damper 43a leads into the plenum chamber 38 from atmosphere and a duct 44 leads from the duct 37 to atmosphere. A damper 44a is provided, by means of which air from the blower 36 be directed either to the plenum chamber 38 or to the duct 44. By means of this arrangement, air is caused to flow through the enclosure countercurrent to the travel of the goods 33 and the introduced air is maintained at the desired temperature and relative humidity.

Figure 4:
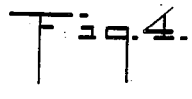
Figure 4 is a fragmentary section of a modification of Figure 2.

In the modification illustrated in Fig. 4, the duct 37 is provided with two spaced dampers 45 beyond the duct 44 and two bypass ducts 46 and 47 lead around that portion of the duct 37 between the dampers 45. In the duct 46 is provided dehumidifying apparatus 48 of any standard type such as an air washer, refrigerator coil, or a chemical adsorptor or absorptor. In the duct 47 is provided humidifying equipment 49 consisting preferably of a steam supply pipe 50 equipped with a control valve 51 regulated by the wet bulb thermostat 42 arranged near the entrance end of the enclosure. In the ducts 46 and 47 are provided dampers 52 and 53 which are simultaneously actuated under the influence of the thermostat 42 to open duct 46 while closing the duct 47 and vice versa. The dampers may be either manually or automatically operated.

The goods 33 are caused to move through the enclosure 30 at a predetermined speed between the infra-red ray sources from which energy is transmitted to the goods to raise the temperature thereof. A stream of air is caused to flow countercurrent to the goods and the heat supplied thereto by the heater 38a is so regulated as to maintain the temperature of the air in contact with the goods only slightly above the temperature of the goods. The optimum temperature of the air flow into the oven through duct 35a can be determined by experimentally establishing once and for all the final temperature of the goods, or by obtaining it through established mathematical computation. Little or no heat is transferred from the air to the goods and the air temperature serves merely to prevent heat loss from the goods. The heating of the goods is effected by the infra-red ray energy. Air may be passed directly from the blower 36a to the plenum chamber 38 without being conditioned or may be conditioned as to its relative humidity by passage of a portion or all of the air through one or the other of the ducts 46 and 47. Steam for adding moisture to the air is supplied through the pipe 50 and is regulated by the valve 51 in response to the thermostat 42.

In Fig. 5, the enclosure 61 is provided with a conveyor 62, by means of which the goods 63 are carried through the enclosure from one end to the other. Sources 64 of infra-red rays are arranged in the enclosure above the conveyor 62 so that the goods 63 pass beneath the sources. By an arrangement of inlet and outlet ducts subsequently to be described, the enclosure is effectively divided into four zones a, b, c and d, the limits of which are indicated by vertical dot-dash lines.

A blower 65 arranged near the discharge end of the enclosure has its outlet communicating with a duct 66 leading into the enclosure. A duct 67 arranged adjacent the left end of zone a leads from the enclosure to a plenum chamber 68 which communicates through a duct 69 with the inlet of the blower 65. The plenum chamber is provided with a heater 70 to which steam is supplied through a pipe 71 provided with a control valve 71a which is responsive to the thermostat 72 arranged in zone a near the right end thereof. A duct 73 provided with a control damper leads from atmosphere to the plenum chamber 68. A blower 74 has its outlet communicating through a duct 75 with the interior of the enclosure near the right end of zone b and has its inlet communicating through a duct 66 with a plenum chamber 77. The plenum chamber 77 is provided with a heater 78 to which steam is supplied through a pipe 79 provided with a control valve 79a responsive to a thermostat 80 arranged in the enclosure near the right end of zone b. A damper-controlled duct 81 leads from the enclosure at about the center of the zone b to the plenum chamber 77 and a damper-controlled duct 82 provides communication from the atmosphere to the plenum chamber.

A blower 83 has its inlet in communication with the enclosure 61 near the left end of the zone b through a duct 84, plenum chamber 85 and damper-controlled duct 86 while a damper-controlled duct 87 provides communication from the atmosphere into the plenum chamber 85. The discharge port of the blower 83 communicates through a damper-controlled duct 88 with the enclosure 61 near the right end of the zone c. Also, the discharge port of the blower 83 communicates with a damper-controlled duct 89 leading to atmosphere. A thermometer 90 is arranged in zone c near the right end thereof.

A blower 91 has its inlet communicating through a duct 92 with a plenum chamber 93 which communicates through a damper-controlled duct 94 with the atmosphere and through a damper-controlled duct 95 with the left end of zone c of the enclosure 61. The exhaust port of the blower communicates through a duct 96 with the right end of the zone d. The plenum chamber 93 is provided with a heater 97 to which steam is supplied through a pipe 98 provided with a control valve 98a responsive to a thermostat 99 arranged in zone d near the right end thereof.

A duct 100 leads from the left end of the zone d to the inlet of a blower 101, the outlet of which communicates with a duct 102 leading to atmosphere. A duct 103 leads from the duct 102 to the plenum chamber 77 and a damper 104 is provided for directing air from the blower 101 either to atmosphere or through the duct 103 to the plenum chamber 77 to provide cooler air than if re-circulated from its own zone. Alternatively, the duct 100 may lead to a different plenum chamber or wherever it is desirable to provide cooler air than if recirculated from its own zone.

The goods 63 move through the enclosure from left to right and the infra-red ray sources 64 are of such number and so arranged that the energy supplied to the goods is progressively decreased in the zones until in zone a no infra-red ray energy is supplied. Hot air is supplied to the right end of zone a through the duct 66 and air is recirculated from the left end of zone a through the duct 67. The air in zone a is maintained at a predetermined temperature by regulating the steam supplied to the heater in response to the heating of the thermostat 72. Hot air also is supplied to the right end of zone b through the duct 75 and air is withdrawn from said zone through the duct 81. The air in the zone b is maintained at a predetermined temperature by air mixtures through ducts 103 and 81 and by regulation of the supply of steam through the pipe 79 in response to the reading of the thermostat 80. Air also is withdrawn from the left end of the zone b by the blower 83 and either is exhausted to atmosphere through the duct 89 or is introduced into zone c through the duct 88.

Air is withdrawn from the left end of the zone c through the duct 95 and is supplied to the right end of the zone d through the duct 96. The air in zone d is maintained at predetermined temperature by regulating the supply of steam through the pipe 98 in response to the reading of the thermostat 99. Air is withdrawn from the zone d and either is discharged into atmosphere through the duct 102 or is returned to the plenum chamber 77 through the duct 103.

In zone d the goods are progressively heated to a predetermined extent and are further heated in zone c but with a slower rise in temperature than in zone d and in zone b are still further heated but with a still slower rise in temperature than in zone c. By the time the goods reach the end of zone b, they have obtained the maximum temperature necessary for drying and in zone a the goods are merely held at the maximum temperature as they progress through the zone a. The change in temperature of the goods is illustrated by the full-line curve g of Fig. 6. The supply and exhaust of air to and from the various zones is so regulated that the temperature of the air in each zone equals or slightly exceeds the maximum temperature attained by the goods in that zone. Such temperature is indicated by the dotted line curve h of Fig. 6. The air supplies little, if any, heat to the goods which are heated by the infra-red rays and serves merely to prevent heat loss from the goods so that the infra-red ray energy is practically entirely applied to heating the goods. The air removed from zone b through the duct 86 is cooled by air introduced through the duct 87 so that air is supplied to the zone c at a lower temperature than it was exhausted from the zone b. Also, air exhausted from the zone c is reduced in temperature by atmospheric air introduced through the duct 84 so that air is introduced into the zone b at a lower temperature than air exhausted from the zone c.

In some conditions of operation, the heater 97 is not needed and in other instances a cooler may be desirable. This heater is required only when the conditions of operation are such that the condition of the air exhausted through the duct 95 renders it unsuitable for introduction into the zone d so that a large portion of the removed air is exhausted to atmosphere and fresh air at atmospheric temperature is used to make up air. It may then be necessary to heat the air supplied to the zone d in order that the temperature of such air will be at least as high as the temperature of the goods 63 in zone d.

In the arrangement of Figs. 2 to 4 as well as in the arrangement of Figs. 5 and 6, the conveyor may move continuously or its movement may be intermittent. Also, the arrangements disclosed herein are merely illustrative and it is to be understood that various modifications may be made therein and particularly any arrangement which the desired application of the invention may require. Also, it is to be understood that various modifications may be made in the structure herein disclosed without in any way departing from the spirit of the invention as defined in the appended claims.

We claim:

1. The method of heat treating an article which comprises passing gasiform fluid around said article, supplying radiant heat to the article, independently attemperating said gasiform fluid responsive to change of temperature of said article to maintain the temperature of the gasiform fluid in the range of from substantially the article temperature to a temperature not more than 10° F. in excess of the article temperature.

2. The method of drying an article which comprises passing gasiform fluid around said article, supplying radiant heat to the article to effect vaporization of volatiles from said article, independently heating said gasiform fluid, and increasing the temperature of said fluid responsive to increase in temperature of said article to maintain the temperature of the gasiform fluid in the range of from substantially the article temperature to a temperature not more than 10° F. in excess of the article temperature.

JOHN O. ROSS.
JEAN F. GSCHWIND.